(12) United States Patent
Forni et al.

(10) Patent No.: US 7,115,239 B2
(45) Date of Patent: Oct. 3, 2006

(54) CATALYSTS FOR AMMONIA SYNTHESIS

(75) Inventors: Lucio Forni, Milan (IT); Nicola Pernicone, Milan (IT)

(73) Assignee: Ammonia Casale S.A., Lugano-Besso (CH)

( * ) Notice: Subject to any disclaimer, the term of this patent is extended or adjusted under 35 U.S.C. 154(b) by 0 days.

(21) Appl. No.: 10/497,795

(22) PCT Filed: Oct. 18, 2002

(86) PCT No.: PCT/EP02/11707

§ 371 (c)(1),
(2), (4) Date: Oct. 18, 2004

(87) PCT Pub. No.: WO03/048045

PCT Pub. Date: Jun. 12, 2003

(65) Prior Publication Data

US 2005/0053541 A1   Mar. 10, 2005

(30) Foreign Application Priority Data

Dec. 5, 2001  (IT) .......................... MI2001A2565

(51) Int. Cl.
*C01C 1/04* (2006.01)
*B01J 21/18* (2006.01)

(52) U.S. Cl. ..................... 423/363; 502/185
(58) Field of Classification Search ............... 423/362, 423/363; 502/325, 185
See application file for complete search history.

(56) References Cited

U.S. PATENT DOCUMENTS

| 4,055,628 A | | 10/1977 | Tennison et al. | |
| 4,163,775 A | * | 8/1979 | Foster et al. | 423/363 |
| 4,271,136 A | | 6/1981 | Tennison | |
| 4,568,530 A | * | 2/1986 | Mandelik et al. | 423/359 |
| 4,568,532 A | | 2/1986 | Le Blanc et al. | |
| 4,600,571 A | * | 7/1986 | McCarroll et al. | 423/363 |
| 4,698,325 A | * | 10/1987 | Andrew et al. | 502/330 |
| 5,061,671 A | * | 10/1991 | Kitson et al. | 502/185 |

FOREIGN PATENT DOCUMENTS

| EP | 0 120 655 | 10/1984 |
| EP | 0 662 343 | 7/1995 |
| EP | 0 931 586 | 7/1999 |
| EP | 1 028 101 | 8/2000 |

OTHER PUBLICATIONS

Forni L et al:, "Carbon-supported promoted Ru catalyst for ammonia synthesis" Applied Catalysis A: General, Elsevier Science, Amsterdam, NL, vol. 185, No. 2, Sep. 20, 1999, pp. 269-275, XP004272107, ISSN: 0926-860X.

* cited by examiner

Primary Examiner—Wayne A. Langel
(74) Attorney, Agent, or Firm—Young & Thompson

(57) ABSTRACT

Catalysts for ammonia synthesis based on ruthenium, directly supported over graphite having BET specific surface area in excess of 10 $m^2/g$, preferably in excess of 100 $m^2/g$ and more preferably in excess of 280 $m^2/g$, the graphite being characterised by X-ray diffraction pattern containing the diffraction lines characteristic of the crystalline graphite only, with exclusion of relevant bands due to amorphous carbon, to which catalysts barium, caesium and potassium are added as promoters. The graphitic supports allow to avoid the known pre-treatments and post-treatments needed in the case of supports obtained by partial graphitisation of active carbons and during use they are affected negligibly by the methanation shown by the supports obtained from active carbons. Furthermore, the catalysts of the present invention are characterised by a very high activity, even with ruthenium loadings well below the known loading.

13 Claims, No Drawings

CATALYSTS FOR AMMONIA SYNTHESIS

The subject of the present invention are catalysts for ammonia synthesis, characterised in particular by a new, advantageous kind of support. Furthermore, the invention relates to innovative methods concerning both the preparation of the support and of the catalyst, and the pre- and post-treatment of the same.

Since one century ammonia is produced industrially by catalytic reduction of nitrogen with hydrogen (Haber-Bosch process), the most employed catalyst being iron, with addition of promoters, such as potassium oxide, alumina and other non reducible oxides. Aiming at the best compromise between thermodynamic and kinetic factors, it has been found particularly advantageous to work at 120–220 bar pressure and 380–520° C. temperature (see e.g. J. R. Jennings (Editor), *Catalytic Ammonia Synthesis, Fundamentals and Practice*, Plenum Press, New York, 1991, and A. Nielsen, *Ammonia Catalysts and Manufacture*, Springer Verlag, Heidelberg, 1995).

In order to operate at a pressure lower than those previously indicated (which allows noticeable advantages from the points of view of plant engineering, economy and security) several other catalytic materials have been considered and ruthenium has been found particularly promising. However, the high cost of this metal entrains a high surface area support, so to allow a higher metal dispersion, i.e. the use of a reduced amount of metal. To this end several supports have been investigated, such as:

$SiO_2$: see Lopez et al., *React. Kinet. Catal. Lett.*, 41 (1990) 217;

$Al_2O_3$: Y. Kadowaki et al., *J. Catal.*, 161 (1996) 178; and S. Murata et al., *J. Catal.*, 136 (1992) 118;

Zeolites: C. T. Fishel et al., *J. Catal.*, 163 (1996) 148; and J. Wellenbüscher et al., *Stud. Surf. Sci. Catal.*, Vol. 84, part B, Elsevier 1994, 941;

MgO: O. Hinrichsen et al., *Chem. Eng. Sci.*, 51 (1996) 1983;

Carbon-covered alumina: K. S. Rama Rao et al., *Appl. Catal.*, 62 (1990) L19; and S. K. Mashtan et al., *J. Molec. Catal.*, 67 (1991) L1;

$MgAlO_4$ spinel: B. Fastrup, *Catal. Lett.*, 48 (1997) 111;

Lanthanides oxides: Y. Niwa et al., *Chem. Lett.*, 1996, 3; and, particularly,

Graphitised carbon: Z. Kowalczyk et al, *Appl. Catal., A: General*, 138 (1996) 83.

The optimal support must satisfy a series of requirements: a) it must not be acidic, b) it must possess a high surface area, to favour metal dispersion, c) it must be chemically stable under the adopted reaction conditions, and d) it must possess a good mechanical strength.

As for requirements a) and b), the most promising material is active carbon. However, in the reaction environment, ruthenium can catalyse the methanation of carbon. To avoid this inconvenience and to increase the mechanical strength of the catalyst, pre-treatments at high temperature have been adopted, which, thanks to a more or less deep graphitisation of carbon, allow to increase the stability of the support, but simultaneously they reduce strongly the surface area (L. Forni, D. Molinari, I. Rossetti, N, Pernicone, *Appl. Catal., A: General*, 185 (1999) 269). A further treatment in air at 425° C. has been proposed, aiming at recovering at least in part surface area and porosity (U.S. Pat. No. 4,163,775), while Z. Zhong et al. (*J. Catal.*, 173 (1998) 535) proposed an additional heating up to 900° C. in flowing hydrogen, to eliminate the impurities present in carbon and/or added during the preparation of the catalyst.

To promote the activity, generally low, of the Ru/C catalysts (K. S. Rama Rao et al., *Appl. Catal.*, 73 (1991) L1), the addition of promoters, such as alkaline metals (S. Murata et al., *Chem. Lett.*, 1990, 1067; alkali-earth metals (K. Aika et al., *J. Catal.*, 136 (1992)); lanthanides (Y. Kadowaki et al., loc. cit.); Y. Niwa et al., loc. cit. and *J. Catal.*, 162 (1996) 138) has been proposed. See also the U.S. Pat. Nos. 4,142,996, 4,163,775, 4,250,057 and 4,600,571).

As already mentioned, the subject of the present invention is a new catalyst for ammonia synthesis, based on ruthenium, characterised by a direct supporting onto particular graphite types, which, with respect to the previous supports based on carbon, present a series of advantages of high technological and economical importance. In fact, thanks to their use, there is no more need to subject the active carbon both to the thermal pre-treatment, in order to graphitise it, at least in part, and to the subsequent oxidising post-treatment, aimed at recovering surface area and porosity (vide supra). In fact, the graphites employed in the present invention already possess the characteristics making them optimal supports for the ammonia synthesis catalyst.

Furthermore, the graphites employed according to the present invention possess a resistance to methanation (i.e. to the formation of methane from carbon in the reaction environment, entraining the deterioration of the support) much higher than that shown by the catalysts supported on pre-treated active carbon: in practice, the formation of methane with the catalysts of the present invention may be detected only after the temperature attains 600° C. and remains minimal also at temperatures of the order of 700° C.

In addition, the catalysts of the present invention are particularly active: with respect to those supported onto pre-treated active carbon, which, as mentioned, are better than those employing other supports, they present a higher activity, also with a much lower ruthenium loading. It is even needless to underline the importance of this result, given the high cost of ruthenium.

The graphites employed as support of the catalyst according to the present invention must possess a BET specific surface area in excess of 10 $m^2/g$, preferably in excess of 100 $m^2/g$ and more preferably in excess of 280 $m^2/g$. Furthermore, they must be characterised by an X-ray diffraction pattern containing the diffraction lines characteristic of the crystalline graphite only, with exclusion of relevant bands due to amorphous carbon. This implies that the graphite shows oleophilic properties. The advantage of the use of oleophilic graphites in the catalyst of the present invention is surprising, because in a previous patent (U.S. Pat. No. 4,600,571) the use of oleophilic graphites was declared to be avoided. A not limitative example of a particularly suitable graphite is that provided as fine powder by Timcal S.A., Bodio, Switzerland, labelled as HSAG 300, possessing a BET specific surface area of ca. 300 $m^2/g$. According to the present invention the graphite is impregnated with an aqueous solution of potassium ruthenate, containing, in the minimal amount of water needed for impregnation, the exact amount of ruthenium needed to obtain the desired concentration of ruthenium in the final catalyst. After removing most of the water in rotating evaporator (at ca. 30–90° C., preferably at ca. 70° C.), the solid is dried in oven overnight at ca. 50–100° C., preferably at ca. 80° C. The ruthenate is then reduced to metallic ruthenium in a tubular oven in flowing hydrogen at 300–340° C., preferably at ca. 320° C. and let to cool down to room temperature in flowing nitrogen. Then the solid is treated with distilled water to eliminate the residual potassium, until the pH of the washing solution becomes neutral, and again dried at ca. 50–100° C., preferably at 80° C.

Then promoters are added, consisting of barium, caesium and potassium, following the results previously published by I. Rossetti, N. Pernicone and L. Forni (the last two being the inventors of the present invention) in *Appl. Catal., A: General*, 208 (2001) 271–278. The promotion consists in the impregnation of the previously obtained solid first with an aqueous solution of barium nitrate, followed by removing of excess water in rotating evaporator, in vacuo, at ca. 35–40° C., then with an aqueous solution of CsOH+KOH, followed by removing of water (vide supra). The amount of the three promoters is such that the atomic ratios of promoters and ruthenium are Ba/Ru=0.4–0.8; Cs/Ru=0.8–1.2; K/Ru=3.0–4.0. Preferably such ratios are Ba/Ru=0.6; Cs/Ru=1; K/Ru=3.5. The loading of ruthenium in the finished catalyst can range from ca. 1% to ca. 10% in weight, according to the circumstance.

At last, the catalyst is formed in pellets of proper dimensions [for instance from 2×2 to 6×6 mm, preferably 3 mm (diameter)×2 mm (height)], by applying a pressure of 2–4 tons/cm$^2$. For the activity tests, the so obtained catalyst, crushed and sieved, so to collect the mesh fraction between 0.10 and 0.35 mm, preferably from 0.15 and 0.25 mm, is diluted, as known by persons skilled in the matter, with an inert solid of the same mesh fraction, for instance with quartz, with a volumetric ratio catalyst/inert solid ranging from 1:10 to 1:30; furthermore, prior to the experiments of ammonia synthesis, the so diluted catalyst is activated by heating, in flowing hydrogen/nitrogen in 3/2 volumetric ratio, for several hours (usually from 4 to 6) at a temperature of 420–470° C. and a pressure of 25–35 bar, with space velocity (GHSV) of 15000–25000 h$^{-1}$.

The following examples intend to illustrate the invention. Three of them have been effected aiming at putting in evidence the superiority of the supports according to the present invention with respect to a graphite support subjected first to oxidation and then to reduction (Example 2) and with respect to supports obtained by partial graphitisation of active carbon, according to known methods, respectively (Examples 7 and 8).

EXAMPLE 1

A sample of commercial graphite, labelled as HSAG 300, produced by Timcal S.A., Bodio, Switzerland, in form of fine powder, with BET specific surface area over 290 m$^2$/g, whose X-ray diffraction pattern does not show any relevant bands due to amorphous carbon, has been impregnated with a solution of potassium ruthenate, containing, in the minimal amount of water, needed for the impregnation, the exact amount of ruthenium, needed for obtaining the desired loading of metal in the final catalyst. Water has been then removed in rotating evaporator in vacuo at 70° C. and the solid so obtained has been dried overnight in oven at 80° C. The ruthenate has been then reduced to metallic Ru by treating in flowing hydrogen, in tubular oven, at 320° C. e then cooled down to room temperature in flowing nitrogen.

After cooling, the solid has been washed repeatedly with distilled water, to remove the residual potassium, till the pH of the washing solution attained the neutral value. After another drying in oven at 80° C. for 4 hours, the promoters (Ba, Cs and K) have been added by impregnation, using aqueous solutions containing, in the minimal amount of water needed for impregnation, the exact amount of BaNO$_3$, and of CsOH+KOH, in the order. After each impregnation the excess water has been removed in rotating evaporator and in vacuo, at 35–40° C.

The Ru loading in the finished catalyst was 8.9 weight % and the atomic ratios of promoters and Ru were Ba/Ru=0.6, Cs/Ru=1 and K/Ru=3.5, respectively.

Then the finished catalyst has been formed in cylindrical pellets 4×4 mm in size, possessing optimal mechanical strength, by applying a pressure of 3 tons/cm$^2$ for 1.5 min, then crushed and sieved, collecting the 0.15–0.25 mm mesh fraction.

The catalytic activity has been determined at 430° C. and 100 bar, by means of a continuous tubular reactor of 9 mm internal diameter, by feeding a reactant gas mixture consisting of hydrogen and nitrogen in volumetric ratio 3/2, with space velocity (GHSV) of 60000 h$^{-1}$, through a catalyst bed of 0.15–0.25 mm particles, diluted with quartz of the same particle dimensions in volumetric ratio catalyst/quartz=1/22. Before the run the catalyst has been activated in situ in a flow of the same reactant gas mixture hydrogen/nitrogen=3/2, at a pressure of 30 bar and at 450° C. for 5 h, with space velocity (GHSV) of 20000 h$^{-1}$. Activity has been determined by evaluating the volumetric concentration of ammonia in the effluent gas, by bubbling in an excess of sulphuric acid solution of know concentration and back-titrating the excess acid with a NaOH solution of know concentration. The result of the activity test is reported in Table 1.

The catalyst has been then subjected to a test of resistance to methanation, under the same conditions of the activity test, by measuring the concentration of methane in the gas out coming from the reactor, while temperature was increased by 2° C./min up to 700° C. The result of the test of resistance to methanation is reported in the same Table 1.

EXAMPLE 2 (COMPARATIVE)

A sample of the same commercial graphite HSAG 300 of Example 1 has been oxidised in flowing air in a tubular oven at 425° C. for 12 h. After cooling in flowing inert gas to remove air, the sample, which lost ca. 20% of the original weight, has been reduced by treating in flowing hydrogen at 900° C. for 3 h, followed by cooling in flowing inert gas down to room temperature. After such a treatment the graphite showed a BET specific surface area of 169 m$^2$/g and porosity of 0.51 cm$^3$/g.

Addition of Ru and of promoters has been done as described in Example 1 and the finished catalyst had a Ru loading of 8.1 weight % and atomic ratios of each promoter and Ru, equal to those of Example 1. The finished catalyst has been pelletised, then crushed and sieved as described in Example 1, collecting the 0.15–0.25 mm mesh fraction.

Activity and resistance to methanation of the catalyst have been determined as described in Example 1 and the results are reported in Table 1.

EXAMPLES 3–6

Samples of the same commercial graphite HSAG 300 of Example 1 have been employed also for the preparation of the catalysts of Examples 3–6, with a Ru loading of 1.90, 3.06, 4.21 and 4.92 weight %, respectively, and atomic ratios of each promoter and Ru identical to those of Example 1. The finished catalysts have been pelletised, then crushed and sieved as described in Example 1, collecting the 0.15–0.25 mm mesh fraction.

Activity and resistance to methanation of the catalysts have been determined as described in Example 1 and the results are reported in Table 1.

EXAMPLE 7 (COMPARATIVE)

A sample of commercial active carbon in 2–4 mm particles, produced by PICA, Levallois (France), made from coconut shell, with BET specific surface area of 1190 $m^2/g$, porosity of 0.49 $cm^3/g$ and ash content of 1.3 weight %, has been heated to 2000° C. in argon for 2 h. After cooling, the sample showed a BET specific surface area of 105 $m^2/g$ and a porosity of 0.12 $cm^3/g$. Then the sample has been oxidised in flowing air, as described in Example 2, with a loss in weight of ca. 25%. Then a reduction in flowing hydrogen followed, as described in Example 2, leading to a final carbon with BET specific surface area of 410 $m^2/g$ and porosity of 0.21 $cm^3/g$. Addition of Ru and of promoters has been done as described in Example 1 and the finished catalyst showed a Ru loading of 4.6 weight % and atomic ratios of each promoter and Ru like those of Example 1. The finished catalyst has been pelletised, then crushed and sieved as described in Example 1, collecting the 0.15–0.25 mm mesh fraction.

Activity and resistance to methanation of the catalyst have been determined as described in Example 1 and the results are reported in Table 1.

EXAMPLE 8 (COMPARATIVE)

A sample of extruded active carbon, in cylindrical particles 4 mm in diameter, produced by CECA, Paris la Defense, France, denoted commercially as AC40, with BET specific surface area 1250 $m^2/g$ and porosity 0.75 $cm^3/g$, has been treated at 1500° C. in argon for 2 h and then subjected to the oxidation and reduction treatments described in Example 7. At last a BET specific surface area of 1470 $m^2/g$ was obtained. This support has been employed for preparing a catalyst following the same procedure of Example 1, except for pelletisation. The finished catalyst had a Ru loading of 13 weight % and atomic ratios of each promoter and Ru like those of Example 1. The finished catalyst has been crushed and sieved as described in Example 1, collecting the 0.15–0.25 mm mesh fraction.

Activity and resistance to methanation of the catalyst have been determined as described in Example 1 and the results are reported in Table 1.

TABLE 1

Activity at GHSV = 60000 $h^{-1}$, 430° C. and 100 bar and resistance to methanation of the catalysts of Examples 1–8.

| Catalyst (Example no.) | $NH_3$ (vol. % in the effluent gas) | Temperature of initial $CH_4$ form. | Area of $CH_4$ signal (mV×min) at 700° C. |
|---|---|---|---|
| 1 | 10.8 | 615 | 1.5 |
| 2 | 2.3 | 615 | 2.5 |
| 3 | 9.3 | 620 | 1.8 |
| 4 | 11.0 | 605 | 1.7 |
| 5 | 11.5 | 600 | 1.1 |
| 6 | 10.0 | 600 | 1.9 |
| 7 | 10.8 | 495 | 8.9 |
| 8 | 11.1 | 490 | 20 |

From the data of the Table the following conclusions can be drawn:

- All the catalysts supported on the as supplied HSAG 300 graphite (Examples 1, 3, 4, 5 and 6) are at least active as, or more active than, those supported on active carbons treated at high temperature and then oxidised and reduced (Examples 7 and 8);
- The treatment of HSAG 300 graphite by oxidation, followed by reduction (Example 2) worsens greatly the activity of the catalyst;
- The catalysts supported onto as supplied HSAG 300 graphite are very active, or even more active than those supported onto pre-treated active carbon, also for much lower Ru loading (compare Examples 3, 4, 5, 6 with Examples 7, 8);
- All the catalysts supported onto as supplied HSAG 300 graphite are much more resistant to methanation than the catalysts supported on pre-treated active carbon (compare Examples 1, 3, 4, 5, 6 with Examples 7, 8), since they start to form methane at 600° C. or at higher temperature and they form very little methane even at 700° C., while the catalysts of Examples 7 and 8 start to form methane already at a temperature lower than 500° C. and at 700° C. they form methane in amounts from 8 up to 20 times higher;
- The treatment of HSAG 300 graphite by oxidation, followed by reduction (Example 2) worsens noticeably the resistance to methanation of the catalyst.

The invention claimed is:

1. A catalyst for ammonia synthesis based on ruthenium, supported on non oxidized pure, fully crystalline graphite having BET specific surface area higher than 10 $m^2/g$ and X-ray diffraction pattern containing the diffraction lines characteristic of the crystalline graphite only, with exclusion of relevant bands due to amorphous carbon, promoted with at least one of the elements selected from the group consisting of barium, caesium and potassium.

2. The catalyst according to claim 1, in which the non oxidized pure, fully crystalline graphite having BET specific surface area higher than 10 $m^2/g$ and X-ray diffraction pattern containing the diffraction lines characteristic of the crystalline graphite only, with exclusion of relevant bands due to amorphous carbon, has BET specific surface area higher than 100 $m^2/g$.

3. The catalyst according to claim 1, in which the non oxidized pure, fully crystalline graphite having BET specific surface area higher than 10 $m^2/g$ and X-ray diffraction pattern containing the diffraction lines characteristic of the crystalline graphite only, with exclusion of relevant bands due to amorphous carbon, has BET specific surface area higher than 280 $m^2/g$.

4. The catalyst according to claim 1, in which the promoters are barium and caesium.

5. The catalyst according to claim 1, in which the promoters are barium and potassium.

6. The catalyst according to claim 1, in which the promoters are potassium and caesium.

7. The catalyst according to claim 1, in which the promoters are barium, caesium and potassium.

8. The catalyst according to claim 7, in which the atomic ratios Ba/Ru, Cs/Ru and K/Ru range between 0.4 and 0.8; 0.8 and 1.2 and 3.0, and 4.0, respectively.

9. The catalyst according to claim 7, in which the atomic ratios Ba/Ru, Cs/Ru and K/Ru are about 0.6:1; 1:1 and 3.5:1, respectively.

10. The catalyst according to claim 1, in which the Ru loading ranges from 1 and ca. 10 weight % of the finished catalyst.

11. The catalyst according to claim 1 formed in pellets having minimum dimensions of 2×2 mm (diameter-height).

12. A process for the preparation of the catalyst according to claim 1, in which non oxidized, pure, fully crystalline graphite having BET specific surface area higher than 10 $m^2/g$ and X-ray diffraction pattern containing diffraction lines characteristic of the crystalline graphite only, with exclusion of relevant bands due to amorphous carbon, is impregnated with an aqueous solution of potassium ruthenate containing, a minimal amount of water needed for impregnation, an amount of ruthenium needed for obtaining Ru loading ranging from 1 and 10 weight % of the finished catalyst; most of the water is removed in rotating evaporator, in vacuo, at 30–90 C and the residual solid is dried at 50–100 C; ruthenate is reduced to metallic ruthenium in flowing hydrogen at 300–340 C and cooled in flowing nitrogen; the potassium is removed by washing in distilled water till neutral pH; the solid is then impregnated with aqueous solutions of $BaNO_3$ and/or CsOH+KOH, both containing, in a minimal amount of water needed for the impregnation, an amount of reagent needed for obtaining effective atomic ratios Ba/Ru, Cs/Ru and K/Ru in the finished catalyst, excess water after each impregnation being removed in vacuo at 35–40 C; the catalyst is then formed in pellets of 2×2 to 6×6 mm.

13. A process for the production of ammonia from gaseous mixtures of hydrogen and nitrogen, employing the catalyst according to claim 1.

* * * * *